United States Patent
Iida et al.

(10) Patent No.: US 9,741,498 B2
(45) Date of Patent: Aug. 22, 2017

(54) CURRENT COLLECTOR, ELECTRODE, SECONDARY BATTERY AND CAPACITOR

(71) Applicants: Furukawa Electric Co., Ltd., Chiyoda-ku, Tokyo (JP); UACJ Foil Corporation, Chuo-ku, Tokyo (JP); UACJ Corporation, Chiyoda-ku, Tokyo (JP)

(72) Inventors: Takahiro Iida, Chiyoda-ku (JP); Yasumasa Morishima, Chiyoda-ku (JP); Takayori Ito, Chiyoda-ku (JP); Hidekazu Hara, Chiyoda-ku (JP); Tsugio Kataoka, Kusatsu (JP); Mitsuya Inoue, Kusatsu (JP); Satoshi Yamabe, Kusatsu (JP); Osamu Kato, Chiyoda-ku (JP); Yukiou Honkawa, Chiyoda-ku (JP); Sohei Saito, Chiyoda-ku (JP); Tatsuhiro Yaegashi, Chiyoda-ku (JP)

(73) Assignees: Furukawa Electric Co., Ltd., Chiyoda-ku, Tokyo (JP); UACJ FOIL Corporation, Chuo-ku, Tokyo (JP); UACJ Corporation, Chiyoda-ku, Tokyo (JP)

( * ) Notice: Subject to any disclaimer, the term of this patent is extended or adjusted under 35 U.S.C. 154(b) by 236 days.

(21) Appl. No.: 14/414,399

(22) PCT Filed: Jul. 11, 2013

(86) PCT No.: PCT/JP2013/069061
§ 371 (c)(1),
(2) Date: Jan. 12, 2015

(87) PCT Pub. No.: WO2014/010708
PCT Pub. Date: Jan. 16, 2014

(65) Prior Publication Data
US 2015/0221452 A1    Aug. 6, 2015

(30) Foreign Application Priority Data
Jul. 13, 2012 (JP) .................................. 2012-157669

(51) Int. Cl.
*H01M 10/052* (2010.01)
*H01G 11/68* (2013.01)
(Continued)

(52) U.S. Cl.
CPC ............. *H01G 11/66* (2013.01); *H01G 11/04* (2013.01); *H01G 11/28* (2013.01); *H01G 11/68* (2013.01);
(Continued)

(58) Field of Classification Search
CPC ........ H01G 11/04; H01G 11/28; H01G 11/68; H01G 11/72; H01M 4/622; H01M 4/625;
(Continued)

(56) References Cited

U.S. PATENT DOCUMENTS

2005/0209392 A1    9/2005    Luo
2008/0241684 A1    10/2008   Muraoka

FOREIGN PATENT DOCUMENTS

DE    37 07 505 A1    9/1987
EP    1 035 604 A1    9/2000
(Continued)

OTHER PUBLICATIONS

International Search Report mailed Sep. 17, 2013, issued in corresponding International Application No. PCT/JP2013/069061, filed Jul. 11, 2013, 6 pages.
(Continued)

*Primary Examiner* — Ula C Ruddock
*Assistant Examiner* — Thomas Parsons
(74) *Attorney, Agent, or Firm* — Christensen O'Connor Johnson Kindness PLLC; Juan Zheng; Llewellyn Lawson (57) ABSTRACT

Provided are a current collector which has an excellent high-rate property and exerts a sufficient safety function when employed in a secondary battery or a capacitor, as well
(Continued)

as an electrode, a secondary battery or a capacitor in which said current collector is employed. According to the invention, a current collector is provided which comprises: metal foil; and a conductive layer with a film thickness of 0.1 μm to 10 μm formed on a surface of said metal foil. Here, said conductive layer includes a conductive material and a binder material. A melting point of said binder material is 80° C. to 150° C. Further, said binder material shows, in differential scanning calorimetry (DSC) in a range from room temperature to 200° C., one or more endothermic peaks in the heating-up process. In a case where said binder material shows two or more endothermic peaks, each difference between said peaks is 15° C. or more. Moreover, said binder material shows one or more exothermic peaks in the cooling-down process. In a case where said binder material shows only one exothermic peak, said exothermic peak falls within a range of 50 to 120° C., and a width at half maximum of said exothermic peak is 10° C. or less. On the other hand, in a case where said binder material shows two or more exothermic peaks, a maximum exothermic peak among said exothermic peaks falls within a range of 50 to 120° C., and a width at half maximum of said exothermic peak is 10° C. or less.

13 Claims, 5 Drawing Sheets

(51) Int. Cl.
    *H01G 11/66* (2013.01)
    *H01M 4/62* (2006.01)
    *H01M 4/66* (2006.01)
    *H01M 10/42* (2006.01)
    *H01G 11/28* (2013.01)
    *H01G 11/70* (2013.01)
    *H01G 11/04* (2013.01)
    *H01G 11/50* (2013.01)
    *H01C 7/02* (2006.01)

(52) U.S. Cl.
    CPC ............ *H01G 11/70* (2013.01); *H01M 4/622* (2013.01); *H01M 4/625* (2013.01); *H01M 4/661* (2013.01); *H01M 4/667* (2013.01); *H01M 10/052* (2013.01); *H01M 10/4235* (2013.01); *H01C 7/027* (2013.01); *H01G 11/50* (2013.01); *Y02E 60/13* (2013.01)

(58) Field of Classification Search
    CPC . H01M 4/667; H01M 10/052; H01M 10/4235
    See application file for complete search history.

(56) References Cited

FOREIGN PATENT DOCUMENTS

| | | | |
|---|---|---|---|
| JP | 2001-357854 A | | 12/2001 |
| JP | 2002-526897 A | | 8/2002 |
| JP | 2006-185854 A | | 7/2006 |
| JP | 2008-077837 A | | 4/2008 |
| JP | 2008-140552 A | | 6/2008 |
| JP | 2009-146752 A | | 7/2009 |
| JP | 2009-176599 A | | 8/2009 |
| JP | 2009176599 | * | 8/2009 |
| JP | 2009295666 | * | 12/2009 |
| JP | 2012-104422 A | | 5/2012 |
| WO | 00/19552 A1 | | 4/2000 |

OTHER PUBLICATIONS

Extended European Search Report, mailed May 27, 2015, issued in corresponding International Patent Application No. PCT/JP2013/069061, filed Jul. 11, 2013, 11 pages.

* cited by examiner

Without CNT

[FIG. 11]

With CNT

CURRENT COLLECTOR, ELECTRODE, SECONDARY BATTERY AND CAPACITOR

TECHNICAL FIELD

The present invention relates to a current collector, an electrode, a secondary battery and a capacitor.

BACKGROUND

Application of lithium-ion secondary batteries to electronic appliances such as cellular phones and notebook computers has been increasing for their high energy density. In a lithium-ion secondary battery, lithium cobalt oxide, lithium manganese oxide, lithium iron phosphate and the like are used as a cathode active material, and graphite and the like are used as an anode active material. A lithium-ion secondary battery is typically composed of electrodes made of the active materials, a separator which is a porous sheet, and an electrolyte in which a lithium salt is dissolved. Such a lithium-ion secondary battery has a high battery capacity and output as well as a good charge-discharge property, and a service life thereof is relatively long.

Although a lithium-ion secondary battery has an advantage of high energy density, it is accompanied by problems associated with safety since it employs a non-aqueous electrolyte. For example, since it contains a non-aqueous electrolyte, a component of the non-aqueous electrolyte possibly decomposes along with heat generation, causing internal pressure to raise, which may lead to defects such as a swollen battery. Further, if a lithium-ion secondary battery is overcharged, defects such as heat generation possibly occur. Moreover, there is a risk that heat generation or other defects are also caused by occurrence of an internal short-circuit. Heat generation of a battery sometimes leads to ignition, and thus, safety measures directed to suppressing it are important.

Examples of means for enhancing safety of battery include prevention of elevation of internal pressure by means of a safety valve, and current interruption at the time of heat generation by incorporating a PTC (Positive Temperature Coefficient) element, whose resistance increases as temperature increases. For example, a method is known in which a PTC element is furnished to a cap portion of the cathode of a cylindrical battery.

However, the method of furnishing a PTC element to the cap portion of the cathode is accompanied by a problem that it is not possible to prevent heat generation due to an internal short-circuit, overcharging or the like.

A separator incorporated in a lithium-ion secondary battery has a function that, when abnormal heat generation occurs, a resin melts and occludes pores of the separator, lowering ion-conductivity so as to suppress increase of short-circuit current. However, a separator located distant from the heat-generating portion does not always melt, and when heat is generated so much that the heat distortion temperature of the resin is exceeded, the separator shrinks with heat, which brings about a risk that a short-circuit is caused adversely. As discussed above, the means for preventing heat generation due to an internal short-circuit, overcharging or the like still have room for improvement.

To resolve the problem of an internal short-circuit, a cathode is proposed which has a PTC layer composed of a crystalline resin and conductive particles. Such a PTC layer has a property that the resin expands near the melting point of the crystalline resin which causes breakage of the network of the conductive particles, and thus, resistance is increased greatly. In Patent Document 1, it is disclosed that carbon particles and a crystalline resin are heated and mixed, resulting mixture is processed into a sheet, and then annealed to give a PTC layer formed on a current collector. Further, in Patent Document 2, a PTC layer is disclosed which includes a crystalline resin such as polyethylene, a conductive material and a binder, and is 5 µm or less. In Patent Document 3, a PTC layer is disclosed which is composed of a polyethylene wax emulsion and carbon microparticles.

PRIOR ART DOCUMENTS

Patent Documents

Patent Document 1: Japanese Translation of PCT International Application Publication No. JP-T-2002-526897

Patent Document 2: Japanese Unexamined Patent Application Publication No. 2001-357854

Patent Document 3: Japanese Unexamined Patent Application Publication No. 2009-176599

SUMMARY OF THE INVENTION

Technical Problem

However, the prior arts described in the above-mentioned documents had room for improvement with respect to the following points.

Firstly, in the PTC layer made by the method described in Patent Document 1, carbon particles are dispersed in the resin while heated, causing a problem that the initial resistance is high. Additionally, the PTC layer made by such a method necessarily has a thickness similar to that of the active material layer, namely, several tens of micrometers. As for the electrode of a lithium-ion secondary battery, it is desired that the energy density is still enhanced. A large film thickness gives rise to reduction in battery capacity.

Secondly, in the PTC layer described in Patent Document 2, when a binder is added, it is difficult to make carbon particles exist only around the crystalline resin, and thus, a conductive network of the carbon particles is inevitably formed also in the binder region. Therefore, even if the conductive network in the vicinity of the crystalline resin is broken due to expansion of the crystalline resin, the conductive network formed in the binder is not broken, so that the in-plane PTC property is non-uniform, making it difficult to secure safety.

Thirdly, in either case of using an aqueous dispersion liquid of polyethylene particles (Chemipearl W401, Chemipearl W410 or Chemipearl W4005) for the PTC layer described in Patent Document 3, or using an aqueous dispersion liquid of polymethacrylic acid-based resin particles (AC-3100) for which ethylene and methacrylic acid are the main component monomers, since resistance change is small, for example, a resistance at 120° C. is only twice as high as an initial resistance or lower, it is difficult to block electric current and safety in the case of overcharge is insufficient. Further, in both cases, adhesiveness to a current collector or the like is low. Moreover, in both cases, when batteries are manufactured employing such current collectors, the battery property when used at a high rate are insufficient.

The present invention was made in view of the above circumstances, and the objects thereof are to provide a current collector which has an excellent high-rate property and exerts sufficient safety functions when used in a secondary battery or a capacitor, as well as an electrode, a secondary battery or a capacitor in which said current collector is employed.

Solution to Problem

According to the present invention, a current collector is provided which comprises: metal foil; and a conductive layer with a film thickness of 0.1 µm to 10 µm formed on a surface of said metal foil. Here, said conductive layer includes a conductive material and a binder material. A melting point of said binder material is 80° C. to 150° C. Further, said binder material shows, in differential scanning calorimetry (DSC) in a range from room temperature to 200° C., one or more endothermic peaks in a heating-up process. In a case where said binder shows two or more endothermic peaks, each difference between said peaks is 15° C. or more. Moreover, said binder material shows one or more exothermic peaks in a cooling-down process. In a case where said binder shows only one exothermic peak, said exothermic peak falls within a range of 50 to 120° C., and a width at half maximum of said exothermic peak is 10° C. or less. On the other hand, in a case where said binder material shows two or more exothermic peaks, a maximum exothermic peak among said exothermic peaks falls within a range of 50 to 120° C., and a width at half maximum of said exothermic peak is 10° C. or less.

A secondary battery or a capacitor employing the current collector has an excellent high-rate property and exerts a sufficient safety function.

According to the present invention, an electrode is provided which comprises: a current collector as described above, and an active material layer including an active material, formed on said conductive layer of said current collector.

Since, this electrode is provided with the current collector described above, when employed in a secondary battery or a capacitor, it provides an excellent high-rate property and a sufficient safety function.

According to the present invention, a lithium secondary battery, a non-aqueous system lithium secondary battery, an electric double layer capacitor or a lithium-ion capacitor is provided which comprises a current collector as described above.

The lithium secondary battery, non-aqueous system lithium secondary battery, electric double layer capacitor or lithium-ion capacitor has an excellent high-rate property and exerts a sufficient safety function, thanks to the current collector described above.

Advantageous Effect of the Invention

According to the present invention, a current collector which has an excellent high-rate property and exerts a sufficient safety function when employed in a secondary battery or a capacitor is obtained, as well as an electrode, a secondary battery or a capacitor employing the current collector.

DESCRIPTION OF EMBODIMENTS

Hereafter an embodiment of the present invention will be described with reference to the drawing. Note that similar components are denoted by similar reference symbols in all figures, and their explanations are omitted where appropriate. Further, it should be understood that, in the present description, "A to B" means "greater than or equal to A and smaller than or equal to B".

<Overall Structure of Electrode>

Figure 1:
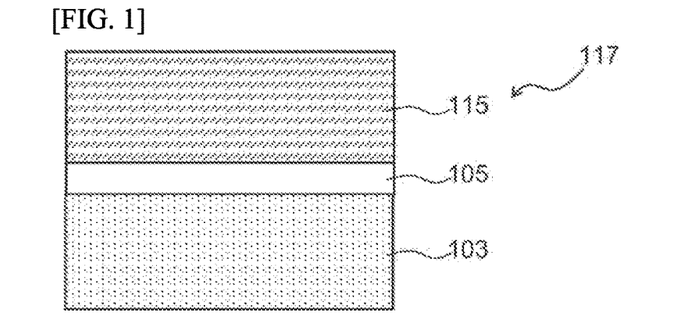
FIG. 1 is a cross-sectional view showing the structure of an electrode according to an embodiment.
Figure 2:
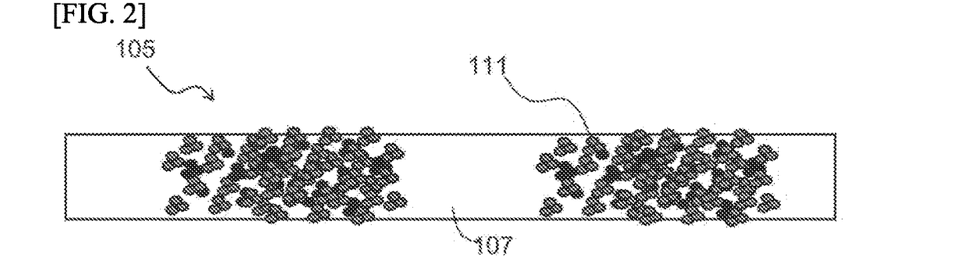
FIG. 2 is a cross-sectional view showing the structure of a conductive layer of the electrode according to the embodiment.

FIG. 1 is a cross-sectional view showing the structure of an electrode according to an embodiment. FIG. 2 is a cross-sectional view showing the structure of a conductive layer of the electrode according to the embodiment. The electrode 117 of the embodiment comprises metal foil 103 and a conductive layer 105 with a film thickness of 0.1 µm to 10 µm formed on a surface of the metal foil 103. An active material layer 115 containing an active material may further be provided on the conductive layer 105.

Here, the conductive layer 105 contains a conductive material 111 and a binder material 107, as shown in FIG. 2.

Figure 3:
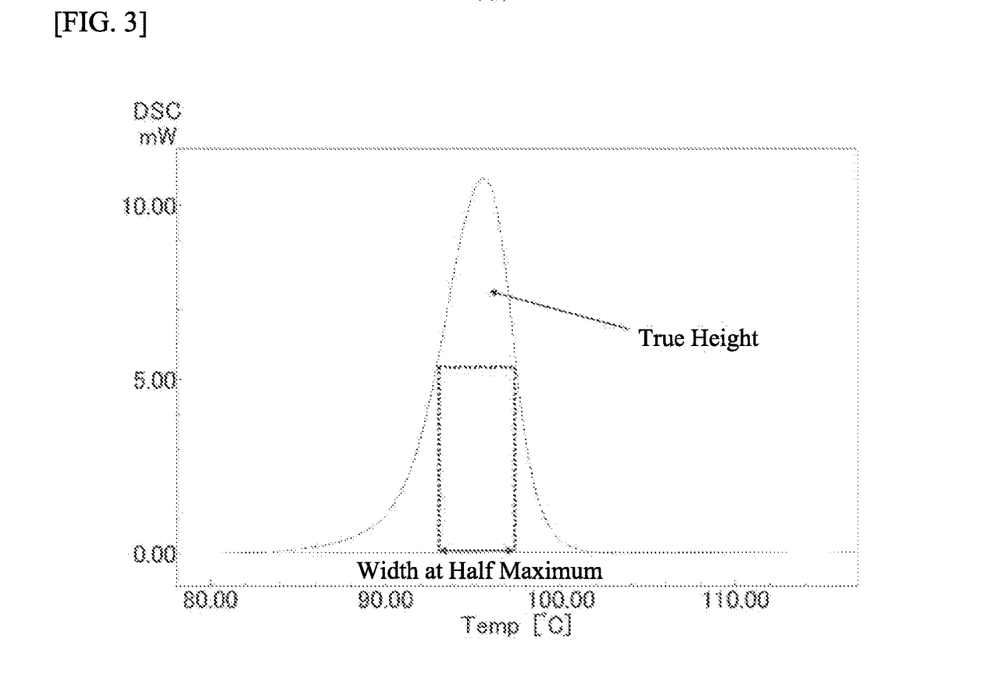
FIG. 3 is a graph for explaining a width at half maximum of a maximum exothermic peak of a binder material of the conductive layer of the electrode according to the embodiment.
Figure 4:
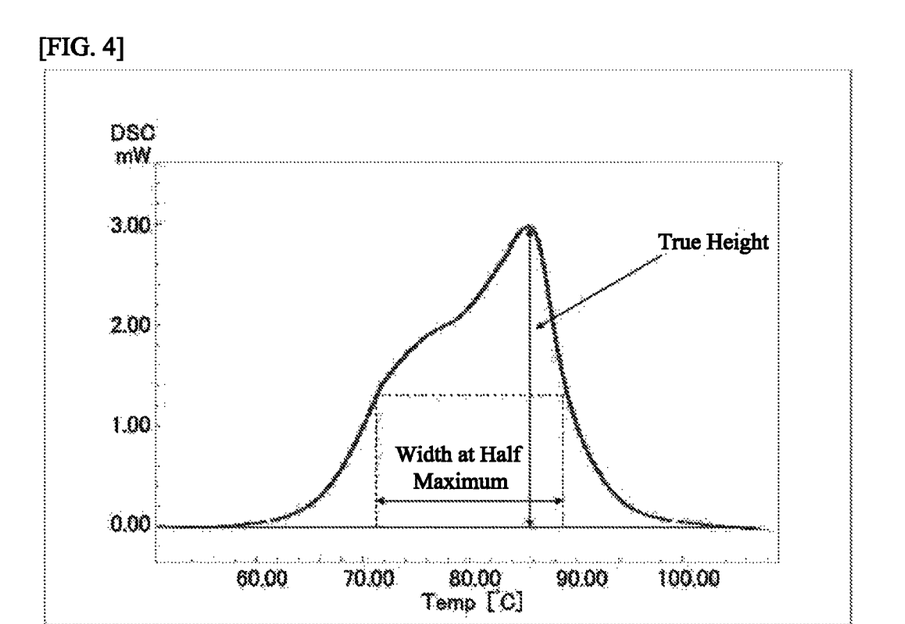
FIG. 4 is another graph for explaining a width at half maximum of a maximum exothermic peak of a binder material of the conductive layer of the electrode according to the embodiment.

FIGS. 3 and 4 are graphs for explaining the width at half maximum of a maximum exothermic peak, appearing in the cooling-down process, of a binder material of the conductive layer of the electrode according to the embodiment (neighboring regions of 200° C. are omitted from the figures). Melting point of the binder material 107 falls within a range of 80° C. to 150° C. Further, as shown in FIG. 3, the binder material 107 shows a maximum exothermic peak somewhere in a rage of 50° C. to 120° C. in the cooling-down process after crystal melting in differential scanning calorimetry (DSC), and the width at half maximum of the maximum exothermic peak is 10° C. or less. In a case where the width at half maximum is 10° C. or more, increase of resistance is not sufficient, and thus, a shutdown function is not exerted.

Figure 5:
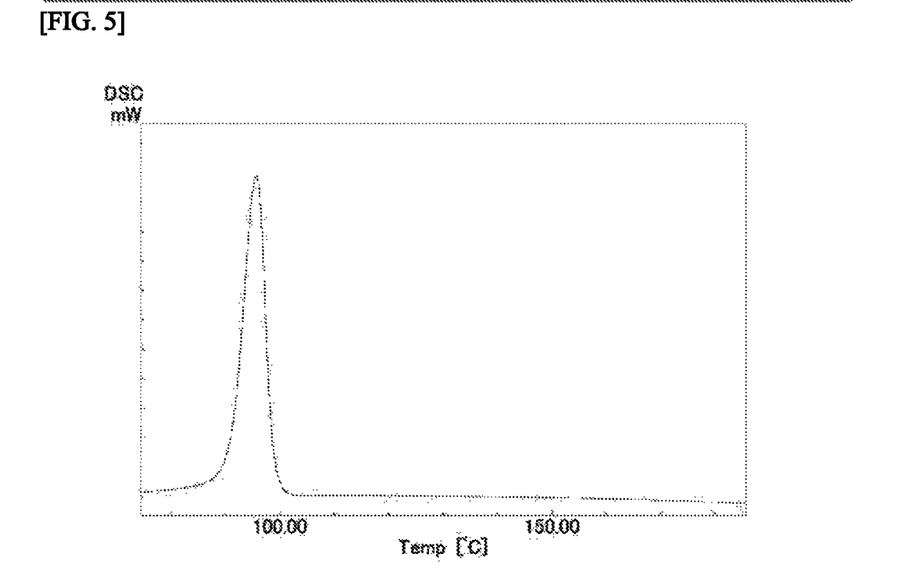
FIG. 5 is a graph for explaining a position of an exothermic peak of a binder material of the conductive layer of the electrode according to the embodiment.
Figure 6:
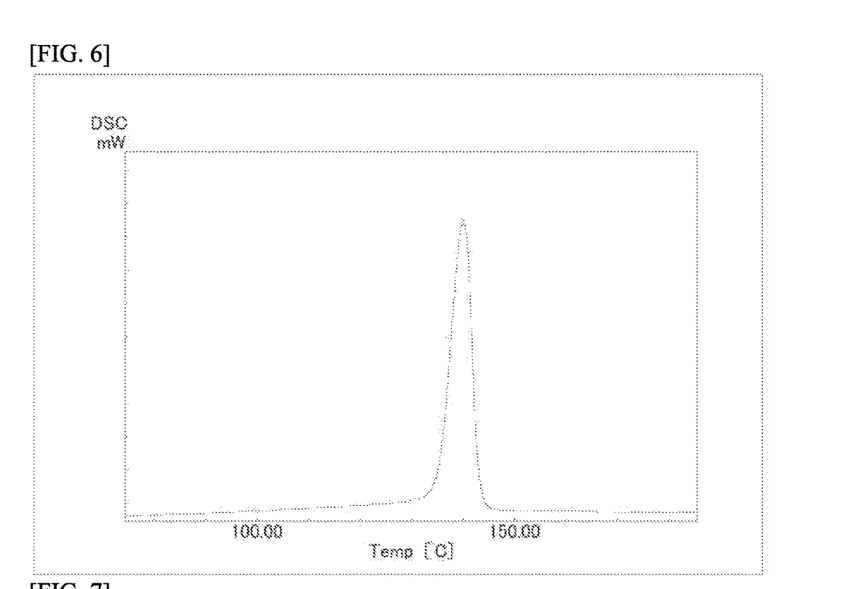
FIG. 6 is a graph for explaining a position of an exothermic peak of a binder material of the conductive layer of the electrode according to the embodiment.

FIGS. 5 and 6 are graphs for explaining a position of an exothermic peak of the binder material of the conductive layer of the electrode according to the embodiment (neighboring regions of 200° C. are omitted from the figure). The binder material shows an exothermic peak in a range of 80° C. to 120° C. in the cooling-down process, as shown in FIG. 5. When the electrode 117 is used, the shutdown function is sufficiently exerted as demonstrated in Example 1 below. In a case where the exothermic peak is at 120° C. or above as shown in FIG. 6, the resistance does not rise immediately when abnormal heat generation occurs, as demonstrated in Example 10 below, and the shutdown function is not exerted.

Figure 7:
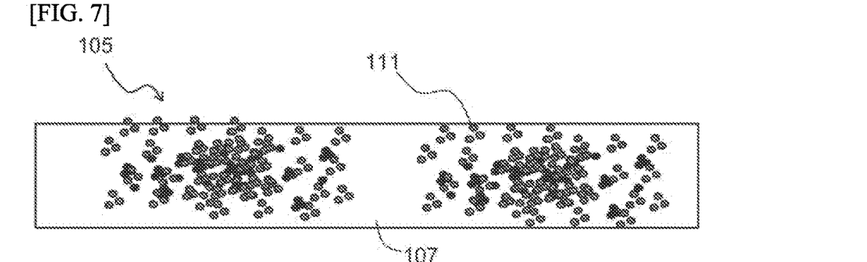
FIG. 7 is a cross-sectional view showing the mechanism by which a resistance of the conductive layer of the electrode according to the embodiment rises suddenly.

FIG. 7 is a cross-sectional view showing the mechanism by which the resistance of the conductive layer of the electrode according to the embodiment rises suddenly. Using the electrode 117, when the temperature within a secondary battery or a capacitor reaches near the melting point of the binder material 107 (140° C. in the case of Example 1), the binder material 107 expands in volume tearing off the contact between the conductive materials 111 dispersed in the conductive layer 105, so that the conductivity thereof decreases. When the binder material 107 shows the maximum exothermic peak somewhere in the rage of 50° C. to 120° C. in the cooling-down process after crystal melting in differential scanning calorimetry (DSC), and the width at half maximum of the maximum exothermic peak is 10° C. or less, volume change of the binder material 107 at the time of melting is large, and it is possible to obtain a good PTC property even with a film thickness of 10 μm or less. As a result, when the temperature within the secondary battery or the capacitor reaches near the melting point of the binder material 107 due to heat generation at the time of overcharging of the secondary battery or the capacitor, the resistance of the conductive layer 105 rises suddenly and the electric current between the current collector and the active material layer is blocked. Accordingly, by using the electrode 117 it is possible to exert a sufficient safety function at the time of abnormal heat generation due to internal short circuit or the like of the secondary battery or the capacitor.

Figure 8:
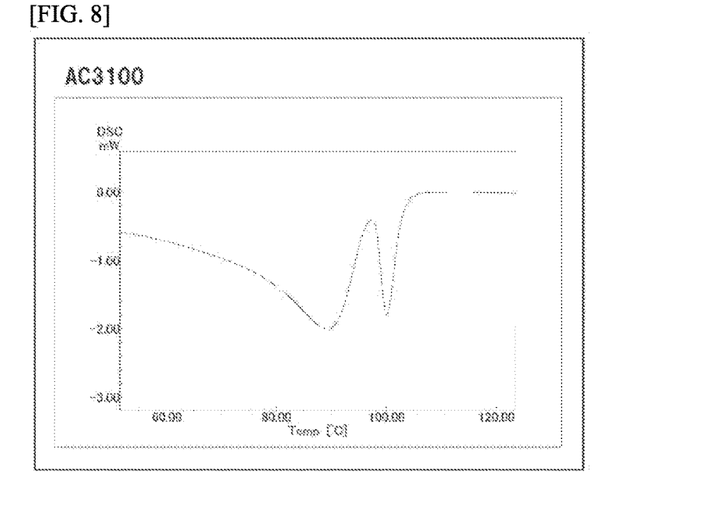
FIG. 8 is a graph showing a result of differential scanning calorimetry (DSC) in a case where an emulsion of polymethacrylic acid-based resin particles made mainly from ethylene and methacrylic acid monomers (AC-3100) is used for a PTC layer in Example 8.
Figure 9:
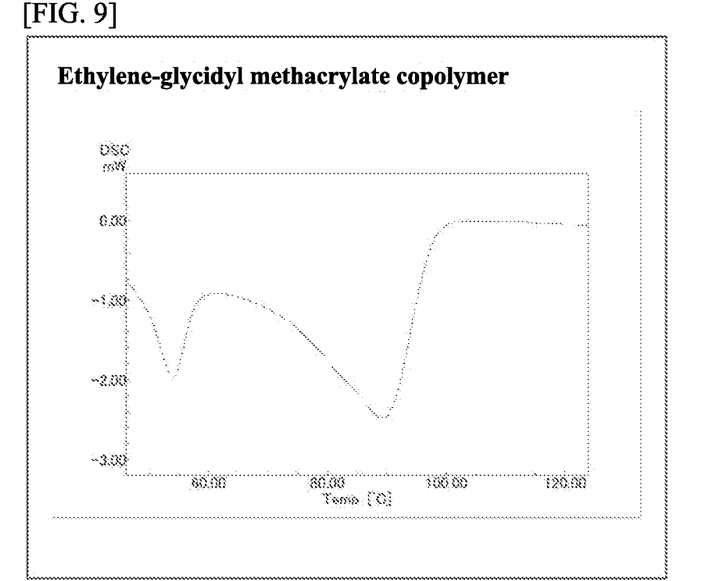
FIG. 9 is a graph showing a result of differential scanning calorimetry (DSC) in a case where an emulsion of ethylene-glycidyl methacrylate copolymer particles is used for a PTC layer in Example 3.

FIGS. 8 and 9 are graphs for explaining situations where two endothermic peaks exist in the heating-up process of the binder material of the conductive layer of the electrode according to the embodiment (neighboring regions of 200° C. are omitted from the figures). In the binder material 107, when two or more endothermic peaks appear in differential scanning calorimetry (DSC), as shown in FIG. 9, the difference between the peaks is 15° C. or more. With this electrode 117, as demonstrated in Example 3 below, in a case where it is employed in a secondary battery or a capacitor, a capacity retention is kept high even after charging-discharging are repeated, so that a secondary battery or a capacitor can be obtained that has an excellent high-rate property and exerts a sufficient safety function without smoke generation even when overcharged. In contrast, if the binder material 107 shows two or more endothermic peaks in differential scanning calorimetry (DSC) and the difference between the peaks is less than 15° C., as shown in FIG. 8, when it is used in a secondary battery or a capacitor, the capacity retention is decreased on repeated charging-discharging, as shown in Example 8 below, and smoke generation occurs when overcharged, and thus, there is room for improvement in the practical aspect.

Hereafter, each component will be described in detail.
<Metal Foil>

For the metal foil 103, it is possible to employ various kinds of metallic foil for a secondary battery or a capacitor. Specifically, a variety of metal foil for cathode and anode can be used, and it is possible to employ, for example, aluminum, copper, stainless steel, nickel and the like. Among them, aluminum and copper are preferable in view of balance between high conductivity and cost. Note that, in the present description, aluminum means pure aluminum as well as aluminum alloy, and copper means pure copper as well as copper alloy. In the present embodiment, aluminum foil can be used as a secondary battery cathode electrode, a secondary battery anode electrode, and a capacitor electrode, and copper foil can be used as a secondary battery anode electrode. Aluminum foil is not particularly limited, and various kinds can be used such as A1085 material, which is one of pure aluminum, A3003 material or the like can be used for it. Similarly, copper foil is not particularly limited, and rolled copper foil or electrolytic copper foil is preferably used.

Thickness of the metal foil 103 is selected depending on the purpose of use and not particularly limited, but preferably set to 5 μm or more and 50 μm or less in the case of a secondary battery. If the thickness is less than 5 μm, strength of the foil is sometimes insufficient, making formation of the conductive layer 105 difficult. In contrast, if the thickness exceeds 50 μm, thickness of another component, especially the active material layer 115 or the electrode material layer, is forced to be reduced accordingly, therefore, in the case of being used as an electricity storage component such as a secondary battery or a capacitor, the thickness of the active material layer 115 should inevitably be reduced, which sometimes lead to a failure in achieving the necessary and sufficient capacity.

<Conductive Layer>

The conductive layer 105 of the present embodiment is a PTC (Positive Temperature Coefficient) layer containing a conductive material 111 and a binder material 107, with a film thickness of 0.1 μm to 10 μm, formed on the surface of the metal foil 103.

The film thickness of the conductive layer 105 of the present embodiment is 0.1 μm to 10 μm. If the thickness is less than 0.1 μm, the resistance sometimes fails to fall sufficiently at the time of abnormal heat generation, so that the shutdown function is not exerted certainly. If the thickness exceeds 10 μm, the resistance under normal conditions is also raised, so that the battery property, specifically the performance at the time of high-rate, is reduced. The thickness of the conductive layer 105 may be, for example, 0.1, 0.3, 0.5, 1, 2, 5 or 10 μm as well as a value in the range between any two of the exemplified values.

Therefore, the melting point of the binder material 107 of the conductive layer 105 of the present embodiment is in the range of 80° C. to 150° C., since the shutdown function of the conductive layer must be exerted prior to the shutdown function of a separator. If the melting point is below 80° C., the shutdown function is exerted even at the normal temperature. Since exertion of the shutdown function of the conductive layer before exertion of the shutdown function of the separator is needed, the melting point of the binder material 107 used in the PTC layer should be 150° C. or below.

Even when a crystalline polymer soluble in organic solvents is used as the binder material 107 used in the PTC layer, if the melting point thereof is high, in the case where the PTC layer is incorporated in a battery, the shutdown function of the separator is exerted before the exertion of the function of the PTC of the conductive layer, and thus, the crystalline polymer is not suitable as the binder material 107. Further, crystalline polymers soluble in organic solvents should be dried at a relatively low temperature in order to allow exertion of PTC, so that problems arise such that productivity becomes low. The melting point of the binder material 107 of the conductive layer 105 may be, for example, 80° C., 90° C., 100° C., 110° C., 120° C., 130° C., 140° C. or 150° C. as well as a temperature in the range between any two of the exemplified values. Note that in the case where only one endothermic peak is shown in the heating-up process of DSC, the endothermic peak is regarded as the melting point, while in the case where a plurality of endothermic peaks are shown, the maximum endothermic peak during heating-up is regarded as the melting point.

Further, it is preferable that the binder material 107 of the conductive layer 105 of the present embodiment shows, in differential scanning calorimetry (DSC) in the range from room temperature (e.g., 50° C.) to 200° C., only one endothermic peak in the heating-up process. Moreover, in the case where two or more endothermic peaks are shown in the heating-up process, it is preferable that each difference between the peaks is 15° C. or more. When two or more endothermic peaks are shown in the heating-up process and the difference between the peaks is less than 15° C., in the case where it is employed in a secondary battery or a capacitor, the capacity retention tends to decrease when charging-discharging is repeated and has a risk of smoke generation when overcharged. Note that the number of endothermic peaks in the heating-up process may be, for example, 1, 2, 3, 4, 5, 6, 7, 8, 9 or 10 as well as a value in the range between any two of the exemplified values. Further, in the case where two or more endothermic peaks are shown in the heating-up process, the difference between the peaks is any one value of 15° C., 20° C., 25° C., 30° C. and 35° C. or more.

Also, the binder material 107 of the conductive layer 105 of the present embodiment shows a maximum exothermic peak somewhere in the range from 50° C. to 120° C. in the cooling-down process after crystal melting in differential scanning calorimetry (DSC). If the exothermic peak is below 50° C., the shutdown function is exerted even at the normal temperature. Otherwise, resistance change is small because of poor crystallinity so that the shutdown function is not exerted. If the exothermic peak is above 120° C., resistance does not rise immediately on abnormal heat generation, so that the shutdown function is not exerted. The maximum exothermic peak in the cooling down process after crystal melting in differential scanning calorimetry (DSC) may be at 50° C., 60° C., 70° C., 80° C., 90° C., 100° C., 110° C. or 120° C. as well as a temperature in the range between any two of the exemplified values.

Further, the width at half maximum of the maximum exothermic peak of the binder material 107 of the conductive layer 105 of the present embodiment is 10° C. or less. If the width at half maximum exceeds 10° C., rise of resistance is insufficient so that the shutdown function is not exerted. The width at half maximum of the maximum exothermic peak may be, for example, 10° C., 9° C., 8° C., 7° C., 6° C., 5° C., 4° C., 3° C., 2° C. or 1° C. or below as well as a value in the range between any two of the exemplified values.

Note that FIG. 3 shows a true height and the definition of a width at half maximum in the case where a single peak exists. That is, in the present description, a width at half maximum means a full width at half maximum (FWHM), not a half value thereof, i.e., not a half width at half maximum (HWHM). However, in the case where a plurality of peaks overlap (especially, in the case where a peak component having a large width at half maximum is involved), the definition is ambiguous, and thus, in FIG. 4 is shown a definition for the case where a plurality of peaks overlap. As described above, for a sample having a plurality of exothermic peaks overlapping one another (resistance change is small), the width at half maximum is not obtained on a maximum exothermic peak obtained through curve fitting using, for example, a Gaussian function, but is obtained in the manner shown in FIG. 4.

As described previously, since the function of PTC must be exerted prior to exertion of the shutdown function of the separator, the melting point of the binder material 107 used for the PTC layer should be 150° C. or below. However, since crystalline resins whose melting point are 150° C. or below are not soluble in organic solvents, in order to prepare a PTC layer having a film thickness of 0.1 µm to 10 µm, it is preferable to use polymer particles whose diameters are small in accordance with the thickness of the layer.

For this reason, the number average particle diameter of the crystalline particles used for the binder material 107 is usually 0.001 µm to 10 µm, preferably 0.01 µm to 5 µm, more preferably 0.1 µm to 2 µm, but not limited thereto. When the number average particle diameter of the crystalline particles remains within this range, it is possible to form a uniform film of 10 µm thick or less, and an excellent binding force can be achieved even if used amount is only a little. The number average particle diameter of the crystalline particles may be, for example, 0.001 µm, 0.005 µm, 0.01 µm, 0.05 µm, 0.1 µm, 0.5 µm, 1 µm, 2 µm, 5 µm or 10 µm as well as a value in the range between any two of the exemplified values.

Describing in a different point of view, if crystalline particles with a number average particle diameter of 10 µm or less is used for the binder material 107, the crystalline particles can be dispersed extensively in the conductive layer 105 by dispersing them in a solvent even if the crystalline particles are not soluble in the solvent. Therefore, even if the conductive material is dispersed non-uniformly in the PTC layer, there are only few parts where the conductive network remains unbroken (parts where the crystalline particles are not distributed) at the temperature at which PTC appears, so that there are few parts where conductivity remains at the temperature at which PTC appears, and the shutdown function is exerted successfully.

Here, the number average particle diameter is a particle number-averaged particle diameter calculated as an arithmetic average value of measured diameters of 100 binder particles selected randomly using a scanning-type electron microscope image. The shape of the particles is not particularly limited, and thus, a spherical shape and an irregular shape are both acceptable. These binders can be used either alone or in combination of two or more kinds.

The crystalline particles used as the binder material 107 are not particularly limited, and polyethylene particles, polypropylene particles, acid-modified polyethylene particles, acid-modified polypropylene particles, ionomer particles, ethylene-glycidyl methacrylate copolymer particles, ethylene-vinyl acetate copolymer particles, ethylene-(meth)acrylic acid copolymer particles, ethylene-(meth)acrylic acid ester copolymer particles and the like can be used. These crystalline particles may be cross-linked with one another. Further, two or more kinds of these crystalline particles may be mixed for use. Acid used for modification of polyethylene and polypropylene includes, without limitation, carboxylic acids. Examples of the carboxylic acids include unsaturated carboxylic acids, derivatives thereof and the like, and examples of the unsaturated carboxylic acids include acrylic acid, methacrylic acid, maleic acid, fumaric acid, itaconic acid, crotonic acid, citraconic acid, sorbic acid and the like. Examples of the derivatives of the unsaturated carboxylic acids include acid anhydrides, esters, amide, imides and the like of the unsaturated carboxylic acid, and more specifically, maleic anhydride, itaconic anhydride, citraconic anhydride, methyl acrylate, methyl methacrylate, ethyl acrylate, butyl acrylate, maleic acid monoethyl ester, acrylamide, maleic acid monoamide, maleimide, N-butyl-maleimide and the like.

It is preferable that the crystalline particles used as the binder material 107 contain one or more kinds of components having an epoxy group, a carboxyl group, or an anhydrous carboxyl group. When the crystalline particles contain the above-mentioned component, adhesiveness to the metal foil 103 is sufficient, and an aggregation structure with a conductive material offering a high PTC property such as carbon particles can be obtained. The crystalline particles are preferably used in a state where they are dispersed in water (emulsion). Further preferable are emulsions of acid-modified polyethylene particles, acid-modified polypropylene particles, and ethylene-glycidyl methacrylate copolymer particles. When an emulsion is used, the crystalline particles can be dispersed uniformly. This allows certain exertion of the shutdown function. Examples of the methods of preparing emulsion include, among others, a method in which the resin is dissolved in a solvent that is insoluble in water, then an emulsifier and water are added, and solvent is evaporated after formation of emulsion, and a method in which a mixture of the resin, an emulsifier and water is heated in a pressure container above the melting point of the resin while water is kept in the liquid state, and the mixture is stirred to give emulsion. As for the emulsion used in the present embodiment, any emulsion is sufficient as long as the particle diameter is 10 μm or less, and the particles are dispersed stably in the liquid, and the method of preparation is not particularly limited.

Since the PTC property of the conductive layer 105 of the present embodiment is influenced by crystallinity, it is preferable that a fraction of ethylene or propylene in the crystalline particles used as the binder material 107 is 80% (percentage by mass) or more, the particles show a maximum exothermic peak somewhere in the rage from 50° C. to 120° C. in the cooling-down process after crystal melting in differential scanning calorimetry (DSC), and the width at half maximum of that maximum exothermic peak is 10° C. or below. When the crystalline particles have such properties, breakage of conductive network occurs to a remarkable extent when the melting point is exceeded, and thus, a very high PTC property is achieved.

It is also preferable that the crystalline particles show only one endothermic peak in the heating-up process in differential scanning calorimetry (DSC). Alternatively, in the case where the crystalline particles show two or more endothermic peaks in the heating-up process, it is preferable that each difference between the peaks is 15° C. or more. When the crystalline particles have such properties, in the case where they are used in a secondary battery or a capacitor, advantages are obtained such that capacity retention is kept high even after charging-discharging is repeated and smoke generation does not occur even if overcharged. Note that the number of endothermic peaks of the crystalline particles in the heating-up process may be, for example, 1, 2, 3, 4, 5, 6, 7, 8, 9 or 10 as well as a value in the range between any two of the exemplified values. Note also that in the case where the number of endothermic peaks of the crystalline particles in the heating-up process is two or more, difference between those peaks may be 15° C., 20° C., 25° C., 30° C. or 35° C. or more.

Molecular weight of the crystalline particles used as the binder material 107 is preferably 10,000 or more in weight average molecular weight. More preferably it is 60,000 or more. When the molecular weight of the crystalline particles is 10,000 or more, a high PTC property can be achieved even with a thin film of 10 μm or less in thickness. Further, the weight average molecular weight of the crystalline particles may be 10,000, 20,000, 30,000, 40,000, 50,000, 60,000, 70,000 or 80,000 or more.

Blending quantity of the binder material 107 is not particularly limited, but it is preferable that a volume percentage of the binder material 107 is 50 to 90% as compared to the overall conductive layer 105, which is taken as 100%. If the blending quantity of the binder material 107 is too large, the number of linking points between the conductive materials 111 becomes small resulting in a high resistance at the normal temperature. If the blending quantity of the binder material 107 is too small, contact between the conductive materials 111 is maintained even at an elevated temperature so that the shutdown function tends to be spoiled. The value may be, for example, 50%, 55%, 60%, 65%, 70%, 75%, 80%, 85% or 90% as well as a value in the range between any two of the exemplified values.

As the conductive material 111 used for the conductive layer 105 of the present embodiment, known conductive materials such as carbon powder or metal powder can be used, and preferable are carbon black such as furnace black, acetylene black and Ketjen black as well as carbon nanotube among others. Especially those whose electrical resistance in the state of powder is $1\times10^{-1}$ Ω·cm as a 100% pressurized powder body are preferable, and the materials described above can be used in combination as needed (that is, carbon black and carbon nanotube may be used together). Their particle size is not particularly limited, but about 10 to 100 nm is preferable. When carbon nanotube is used, one with an aspect ratio of 10 or more is preferable, since electrical conductivity is excellent. Note that the aspect ratio may be 10, 15, 20, 25, 30, 35, 40, 45, 50, 60, 70, 80, 90 or 100 or more as well as a value in the range between any two among these values.

Figure 10:
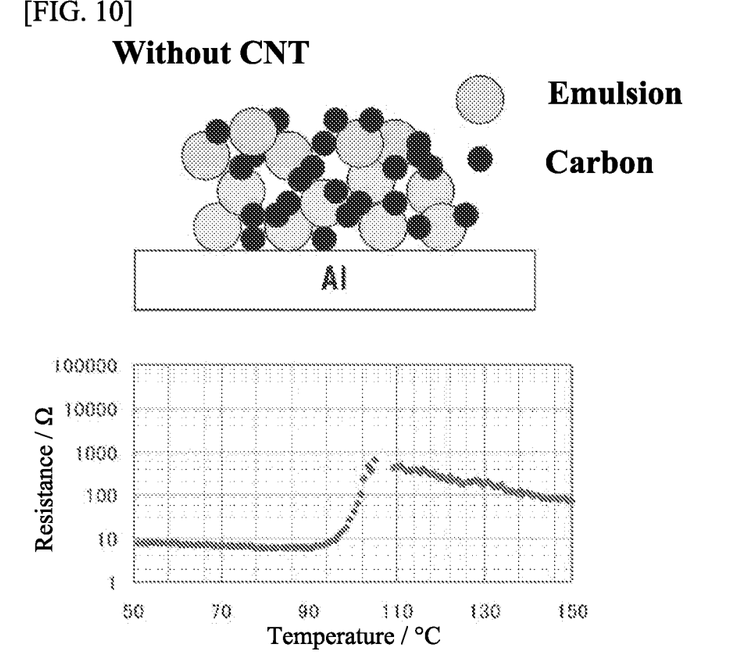
FIG. 10 is an illustration for explaining a case where acetylene black and an acid-modified polyethylene emulsion are used for a PTC layer in Example 4.

FIG. 10 is an illustration showing a conceptual diagram (top) of the structure of a current collector in which acetylene black and an acid-modified polyethylene emulsion are used for the PTC layer in Example 4 below, as well as a graph (bottom) showing a range of 50° C. to 150° C. of a result of measurement of resistance change for that current collector (conductive rubber is used) in which temperature is raised from room temperature to 200° C. at a rate of 10° C./min. As seen in the figure, even in the case where only acetylene black is used as the conductive material 111 for the conductive layer 105, the initial resistance at room temperature R0 is below 10Ω since conductive paths are formed by the acetylene black, and when the shutdown function is exerted at 140° C., the conductive paths are broken so that the magnification of resistance is 108.9, which is sufficiently high.

Figure 11:
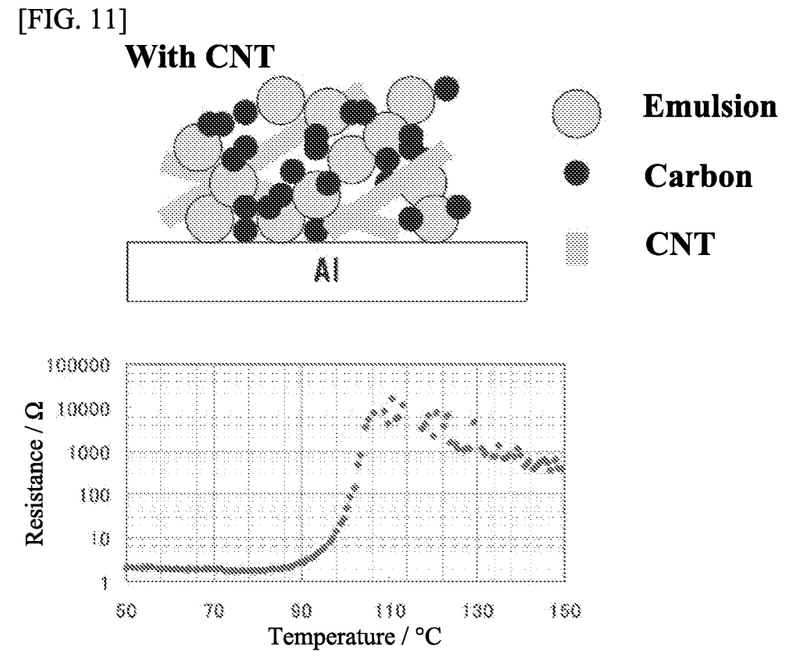
FIG. 11 is an illustration for explaining a case where acetylene black, an acid-modified polyethylene emulsion and a dispersion liquid of carbon nanotube are used for a PTC layer in Example 5.

On the other hand, FIG. 11 is an illustration showing a conceptual diagram (top) of the structure of a current collector in which acetylene black, an acid-modified polyethylene emulsion and a carbon nanotube dispersion liquid are used for the PTC layer in Example 6 below, as well as a graph (bottom) showing a range of 50° C. to 150° C. of a result of measurement of resistance change (conductive rubber is used) in which temperature is raised from 50° C.

to 200° C. at a rate of 10° C./min. As seen in the figure, in the case where acetylene black and carbon nanotube are used in combination as the conductive material 111 for the conductive layer 105, the initial resistance at 50° C. is below 5Ω, which is sufficiently low, since conductive paths are formed by the acetylene black and carbon nanotube, and when the shutdown function is exerted at 140° C., the conductive paths formed by the acetylene black and carbon nanotube are broken so that the magnification of resistance is 20,267, which is extremely high. That is, it is more preferable to use acetylene black and carbon nanotube in combination than to use acetylene black alone as the conductive material 111 used for the conductive layer 105, since not only the initial resistance but also the magnification of resistance are remarkably improved.

Blending quantity of the conductive material 111 is not particularly limited, and it is preferable that a volume percentage of the conductive material 111 is 10 to 50% as compared to the overall conductive layer 105, which is taken as 100%. If the blending quantity of the conductive material 111 is too small, the number of linking points between the conductive materials 111 becomes small resulting in a high resistance at the normal temperature. If the blending quantity of the conductive materials 111 is too large, contact between the conductive materials 111 is maintained even at an elevated temperature so that the shutdown function tends to be spoiled. The value may be, for example, 10, 15, 20, 25, 30, 35, 40, 45 or 50% as well as a value in the range between any two of the exemplified values.

The conductive layer 105 of the present embodiment can be manufactured, for example, by dissolving (dispersing) the binder material 107 described above in a solvent, mixing the conductive material 111 therewith to form a paste, and thereafter applying onto the metal foil 103 and drying. Here, the solvent used is not particularly limited, provided that the binder resin is soluble (or dispersible) and the conductive particles can be dispersed therein.

Further, the application method is not particularly limited, and a known method can be employed such as the cast method, the bar coater method, the dip method, or the gravure coat method. Likewise, the drying method is not particularly limited, and drying by heating in a circulating hot air oven or the like may be employed.

It is preferable that the conductive layer 105 of the present embodiment is subjected to heat treatment in a range between 100° C. to 150° C. after being applied onto the metal foil 103. The heat treatment may be performed as part of drying treatment or as a separate process after the drying treatment. Time period of the heat treatment is preferably 1 to 180 minutes. Performing the heat treatment provides an advantage that the PTC property is improved. Note that the temperature of the heat treatment may be in the range between any two values among 100° C., 110° C., 120° C., 130° C., 140° C. and 150° C. Further, the time period of the heat treatment may be in the range between any two values among 1, 2, 3, 4, 5, 10, 20, 30, 60, 120 and 180 minutes.

<Current Collector>

The current collector of the present embodiment includes the metal foil 103 and the conductive layer 105 formed on the surface of the metal foil 103. For the PTC function of the current collector of the present embodiment to be regarded as sufficiently good in practical use, it is preferable that, in a resistance-temperature curve, for which resistance is measured on an object formed of a conductive rubber with a diameter of 1 cm which is sandwiched by a pair of said current collectors, which in turn are sandwiched by cylindrical electrodes made of brass with a diameter of 1 cm, while temperature is raised from room temperature to 200° C. at a raising rate of 10° C./min. in a state where a load of 50 N is applied between said electrodes, Rmax/Rmin is 3 or more, where Rmax denotes a maximum resistance, Rmin denotes a minimum resistance between T0 and Tmax, and Tmax denotes a temperature at which resistance is Rmax. The ratio of Rmax/Rmin may be 3, 4, 5, 6, 7, 8, 9, 10, 20, 30, 40, 50, 100, 500, 1000, 1500, 2000, 2500 or 3000 or more as well as a value in the range between any two among these values. Since the initial resistance obtained in the measurement using the conductive rubber described above is correlated with capacity retention of a battery, the measurement is preferably performed using the conductive rubber.

Alternatively, a maximum resistance Rbmax which is observed for the current collector in a range above 50° C. and at or below 200° C. is preferably three times a resistance R50 at 50° C. or more. Further, the ratio Rbmax/R50 may be 3, 4, 5, 6, 7, 8, 9, 10, 20, 30, 40, 50, 100, 500, 1000, 1500, 2000, 2500 or 3000 or more as well as a value in the range between any two of these values.

<Active Material Layer>

The electrode 117 of the present embodiment is provided with the active material layer 115, containing an active material, formed on the conductive layer 105. Since, in the electrode 117, the active material layer containing active material particles is provided on the current collector in which the current collecting foil described above is used, a good discharge rate property is achieved.

The active material particles contained in the active material layer 115 of the electrode 117 of the present embodiment may be either a cathode active material or an anode active material. The cathode active material for a secondary battery used for its cathode is not particularly limited, but a material which can absorb/release lithium (ions) is preferred. Specifically, lithium cobalt oxide (LiCoO$_2$), lithium manganese oxide (LiMn$_2$O$_4$), and lithium nickel oxide (LiNiO$_2$), which are used conventionally, and additionally, ternary lithium compounds (Li(Co$_x$Mn$_y$Ni$_z$)O$_2$) of Co, Mn and Ni, lithium iron phosphate (LiFePO$_4$), phosphoric acid manganese lithium (LiMnPO$_4$), sulfur (S), TiS$_2$, LiS$_2$, FeS$_2$, Li$_2$MnO$_3$, LiFePO$_4$F, Li$_2$FeSiO$_4$, FeF$_3$ and the like can be used.

As the anode active material for a secondary battery used for its anode, known materials can be used. Usable materials include, without limitation, for example, a graphite system represented by graphite, an amorphous carbon system, lithium titanate (Li$_4$Ti$_5$O$_{12}$), and an oxide system.

As an active material used for electrodes of an electric double layer capacitor, known materials can be used. Usable materials include, without limitation, for example, a graphite system represented by graphite, an amorphous carbon system, and an oxide system.

Materials usable as the binder resin for binding the active material described above include, without limitation, a fluorine-based resin represented by PVDF (polyvinylidene difluoride), polysaccharide polymers, or SBR. Further, those materials described above for the conductive layer can be used as well.

The binder resin described above can be dissolved in a solvent or mixed with active material particles and an conductive material, then, in this state, applied onto the conductive layer 105 described above and dried, to build up the electrode 117.

An embodiment of the present invention has been described thus far with reference to the drawing, however, the embodiment is only an exemplification of the invention, and various configurations other than those described above can be adopted.

EXAMPLES

Hereafter, the present invention will be described further with some examples, but the examples should not be understood for limiting the invention.

Example 1

3.3 g of acetylene black and 49.92 g of resin A (acid-modified polypropylene emulsion; solid content: 29.5%, number average particle diameter: 0.3 μm, weight average molecular weight: 80,000) were mixed, and thereafter stirred by a disperser to produce a coating liquid. The coating liquid obtained was applied on A1085 foil (15 μm thick) such that the film thickness was 2 μm, and dried at 100° C. for two minutes to give a current collector having a conductive layer with a film thickness of 2.2 μm. Note that the coating property of the emulsion of resin A onto A1085 foil was good (only a little non-uniformity of coating was recognized through visual examination by the naked eye).

Example 2

3.3 g of acetylene black and 48.9 g of resin B (acid-modified polypropylene emulsion; solid content: 30.1%, number average particle diameter: 0.3 μm, weight average molecular weight: 20,000) were mixed, and thereafter stirred by a disperser to produce a coating liquid. The coating liquid obtained was applied on A1085 foil (15 μm thick) such that the film thickness was 2 μm, and dried at 100° C. for two minutes to give a current collector having a conductive layer with a film thickness of 2.2 μm. Note that the coating property of the emulsion of resin B onto A1085 foil was good (only a little non-uniformity of coating was recognized through visual examination by the naked eye).

Example 3

2.9 g of acetylene black and 30.2 g of resin C (ethylene-glycidyl methacrylate copolymer emulsion; solid content: 40.2%, number average particle diameter: 1.5 μm, weight average molecular weight: 30,000) were mixed, and thereafter stirred by a disperser to produce a coating liquid. The coating liquid obtained was applied on A1085 foil (15 μm thick) such that the film thickness was 2 μm, and dried at 100° C. for two minutes to give a current collector having a conductive layer with a film thickness of 3.2 μm. Note that the coating property of resin C onto A1085 foil was good (only a little non-uniformity of coating was recognized through visual examination by the naked eye).

Example 4

2.9 g of acetylene black and 48.5 g of resin D (acid-modified polyethylene emulsion; solid content: 25%, number average particle diameter: 0.2 μm, weight average molecular weight: 60,000) were mixed, and thereafter stirred by a disperser to produce a coating liquid. The coating liquid obtained was applied on A1085 foil (15 μm thick) such that the film thickness was 2 μm, and dried at 100° C. for two minutes to give a current collector having a conductive layer with a film thickness of 2.3 μm. Note that the coating property of resin D onto A1085 foil was good (only a little non-uniformity of coating was recognized through visual examination by the naked eye).

Example 5

0.7 g of acetylene black and 18.8 g of resin A (acid-modified polypropylene emulsion; solid content: 29.5%, number average particle diameter: 0.3 μm, weight average molecular weight: 80,000) were mixed, and thereafter 6.4 g of a dispersion liquid of carbon nanotube (aspect ratio of carbon nanotube: 30, 1% aqueous dispersion liquid in VGCF-H manufactured by Showa Denko, detergent: BYK-190 manufactured by BYK-Chemie GmbH, ultrasonic treatment: one hour) was added. The mixture was then stirred by a disperser to produce a coating liquid. The coating liquid obtained was applied on A1085 foil (15 μm thick) such that the film thickness was 2 μm, and dried at 100° C. for two minutes to give a current collector having a conductive layer with a film thickness of 1.7 μm. Note that the coating property of resin A onto A1085 foil was good (only a little non-uniformity of coating was recognized through visual examination by the naked eye).

Example 6

0.7 g of acetylene black and 22.8 g of resin D (acid-modified polyethylene emulsion; solid content: 25%, number average particle diameter: 0.2 μm, weight average molecular weight: 60,000) were mixed, and thereafter 6.5 g of a dispersion liquid of carbon nanotube (aspect ratio of carbon nanotube: 30, 1% aqueous dispersion liquid in VGCF-H manufactured by Showa Denko, detergent: BYK-2015 manufactured by BYK-Chemie GmbH, ultrasonic treatment: one hour) was added. The mixture was then stirred by a disperser to produce a coating liquid. The coating liquid obtained was applied on A1085 foil (15 μm thick) such that the film thickness was 2 μm, and dried at 100° C. for two minutes to give a current collector having a conductive layer with a film thickness of 1.8 μm. Note that the coating property of resin D onto A1085 foil was good (only a little non-uniformity of coating was recognized through visual examination by the naked eye).

Example 7

2.9 g of acetylene black and 43.2 g of resin E (ionomer emulsion; solid content: 28.1%, number average particle diameter: 0.1 μm) were mixed, and thereafter stirred to produce a coating liquid. The coating liquid obtained was applied on A1085 foil (15 μm thick) such that the film thickness was 2 μm, and dried at 100° C. for two minutes to give a current collector having a conductive layer with a film thickness of 2.2 μm. Note that the coating property of resin E onto A1085 foil was good (only a little non-uniformity of coating was recognized through visual examination by the naked eye).

Example 8

2.9 g of acetylene black and 27.1 g of resin F (Aquatech AC-3100 manufactured by CSC Co., Ltd.; solid content: 45%, number average particle diameter: 0.7 μm) were mixed, and thereafter stirred to produce a coating liquid. The coating liquid obtained was applied on A1085 foil (15 μm thick) such that the film thickness was 2 μm, and dried at 100° C. for two minutes to give a current collector having a conductive layer with a film thickness of 2.8 μm. Note that the coating property of resin F onto A1085 foil was good (only a little non-uniformity of coating was recognized through visual examination by the naked eye).

Example 9

2.9 g of acetylene black and 34.8 g of resin G (polyethylene wax emulsion; solid content: 34.9%, number average particle diameter: 0.6 μm, weight average molecular weight: 8,000) were mixed, and thereafter stirred to produce a coating liquid. The coating liquid obtained was applied on A1085 foil (15 μm thick) such that the film thickness was 2 μm, and dried at 100° C. for two minutes to give a current collector having a conductive layer with a film thickness of 2.3 μm. Note that the coating property of the emulsion of resin G onto A1085 foil was not good (much non-uniformity of coating was recognized through visual examination by the naked eye).

Example 10

0.4 g of acetylene black, 2.1 g of resin H (polyvinylidene difluoride; weight average molecular weight: 300,000) and 22.5 g of NMP (N-methyl-2-pyrrolidone) were mixed, and thereafter stirred to produce a coating liquid. The coating liquid obtained was applied on A1085 foil (15 μm thick) such that the film thickness was 2 μm, and dried at 120° C. for two minutes to give a current collector having a conductive layer with a film thickness of 2.0 μm. Note that the coating property of resin F onto A1085 foil was good (only a little non-uniformity of coating was recognized through visual examination by the naked eye).

<Measurement of Melting Point>

Melting points of the resins after vacuum drying were measured according to JIS K7121 using a differential scanning calorimeter (DSC-60A) manufactured by Shimadzu Corporation. Results are shown in Table 1. In the case where only one endothermic peak is shown in the heating-up process, the temperature of that peak is the melting point. In the case where two or more peaks are shown, the temperature of the maximum endothermic peak is regarded is the melting point.

<Temperature of Exothermic Peak During Cooling-Down>

In the case where the temperature has not reached 200° C. after measurement of melting point, the temperature was raised continuously to 200° C. at a raising rate of 10° C./min., and temperature and width at half maximum of exothermic peaks were measured while the temperature was lowered from 200° C. to 50° C. at a lowering rate of 10° C./min. Results are shown in Table 1.

In the case where only one exothermic peak is shown in the cooling-down process, that peak is the "maximum exothermic peak". The "true height" of the peak is defined as the length of a line segment between the vertex of that peak and the point of intersection of a perpendicular line from the vertex to the abscissa and a base line of the exothermic curve.

In the case where two or more exothermic peaks are shown, the "maximum exothermic peak" means the peak for which the "true height" defined in the same way as described above is the highest. Further, also in this case, the "true height" of the "maximum exothermic peak" is defined in the same way as described above. The "width at half maximum" is defined as a temperature width in which the exothermic curve exists at or above the height of the midpoint of a line segment corresponding to the "true height".

<Measuring Method of Particle Diameters of Emulsion>

A sample obtained by vacuum drying each of the emulsions was observed under a scanning-type electron microscope (SEM) to measure the particle diameter of the emulsion. Here, the number average particle diameter is a particle diameter averaged with respect to the number of particles calculated as an arithmetic average of measured diameters of 100 particles selected randomly under SEM observation. Results are shown in the contents of Examples 1 to 10 described above.

<Weight Average Molecular Weight>

Measurement was performed by gel permeation chromatography (GPC) on a GPC apparatus manufactured by Nihon Waters K.K., using GMH-6 manufactured by Tosoh Corporation as a column and o-dichlorobenzene as a solvent, at a temperature of 135° C. and a flow rate of 1.0 ml/min. The weight average molecular weight was obtained in terms of polystyrene.

<Film Thickness>

The thickness of the conductive layer was calculated from a difference of thickness between a conductive layer-formed portion and an unformed portion (portion with only aluminum) using a film thickness measuring machine, Keitarou G (manufactured by Seiko em).

<PTC Property Evaluation 1>

A current collector (1 cmϕ) provided with a conductive layer is sandwiched by brass electrodes, and resistance at 50° C. was measured with a resistance meter (Model 3451 manufactured by Hioki E.E. Corporation) while applying a load of 5 N, and then the measured initial resistance was evaluated based on the criteria.

(1) Criteria for Initial Resistance (R50)
A: smaller than 1Ω
B: greater than or equal to 1Ω and smaller than 5Ω
C: greater than or equal to 5Ω and smaller than 10Ω
D: greater than or equal to 10Ω

The result of evaluation of the measured initial resistance R50 is shown in Table 2.

(2) Ratio of Rbmax/R50

Thereafter, temperature was raised from 50° C. to 200° C. at a rate of 10° C./min. and resistance change was measured. The ratio of the measured maximum resistance Rbmax to the initial resistance R50 is shown in Table 2.

<PTC Property Evaluation 2>

Next, measurements for the current collectors obtained by the present invention were evaluated based on the following criteria. That is, a conductive rubber was sandwiched at both surfaces thereof by two current collectors each provided with a conductive layer, which in turn were sandwiched by brass electrodes of 1 cmϕ, and resistance at 30±5° C. was measured by a resistance meter (Model 3451 manufactured by Hioki E.E. Corporation) while applying a load of 50 N between the electrodes, which resistance was regarded as the resistance R0 at room temperature. For the conductive rubber used here, anything may be suitable provided that it has specific resistance sufficiently lower than the current collector to be measured and reasonable resiliency, and its temperature dependency of resistance is small, and Shin-Etsu Silicone EC-60BL (specific resistance: 0.9 Ωcm, degree of hardness (A): 66) manufactured by Shin-Etsu Chemical Co., Ltd., for example, can be used.

(1) Criteria for Initial Resistance (R0)
A: smaller than 1Ω
B: greater than or equal to 1Ω and smaller than 5Ω
C: greater than or equal to 5Ω and smaller than 10Ω
D: greater than or equal to 10Ω

The result of evaluation of the measured initial resistance R0 is shown in Table 3.
(2) Criteria for Minimum Resistance (Rmin)
A: smaller than 1Ω
B: greater than or equal to 1Ω and smaller than 5Ω
C: greater than or equal to 5Ω and smaller than 10Ω
D: greater than or equal to 10Ω

The result of evaluation of the measured minimum resistance (Rmin) is shown in Table 3.
(3) Ratio of Rmax/Rmin Thereafter, resistance was measured while temperature of a sample was raised from room temperature to 200° C. at a rate of 10° C./min. In the resistance-temperature curve obtained, the temperature at which maximum resistance Rmax is observed is referred to Tmax, room temperature is referred to T0, the minimum resistance in the range from T0 to Tmax is referred to Rmin, the temperature at which Rmin is observed is referred to Tmin. Here, Tmax>Tmin. The ratio Rmax/Rmin is shown in Table 3.
(3) Capacity Retention
(3-1) Manufacturing of Battery
(3-1-1) Manufacturing of Cathode An active material paste ($LiMn_2O_4$/AB/PVDF=89.5/5/5.5, solvent: NMP (N-methyl-2-pyrrolidone)) was applied onto the current collector having the conductive layer manufactured by the above method, and dried. Further, press was applied to form an active material layer of 60 μm thickness.
(3-1-2) Manufacturing of Anode An active material paste (MCMB (mesocarbon microbead)/AB/PVDF=93/2/5, solvent: NMP) was applied onto copper foil of 10 μm thickness and dried. Further, press was applied to form an active material layer of 40 μm thickness.

(3-1-3) Manufacturing of Cylindrical Lithium-Ion Battery

These cathode and anode, an electrolyte (1M LiPF6, EC (ethylene carbonate)/MEC (methyl ethyl carbonate)=3/7), and a separator (thickness: 25 μm, microporous polyethylene film) were wound, and leads are welded to the cathode and anode and connected to terminals thereof, which were inserted in a case to yield a cylindrical lithium-ion battery (φ 18 mm×axial length 65 mm).
(3-2) Measurement of Capacity Retention (High Rate Property)

Using the cylindrical lithium-ion battery, constant voltage and constant current charging at 1 C was performed up to 4.2 V followed by constant current discharging at 1 C and 5 C, respectively, and discharge retention=(discharged capacity at 5 C)/(discharged capacity at 1 C) was calculated from their discharged capacity values, which was evaluated base on the following criteria.
Criteria for Capacity Retention
A: greater than or equal to 0.80
B: greater than or equal to 0.75 and smaller than 0.80
C: greater than or equal to 0.70 and smaller than 0.75
D: smaller than 0.70

A capacity retention of 0.70 or higher at 5 C (5 cycles) means sufficient performance as a battery. A capacity retention of 0.8 or higher at 5 C means that high-rate use is possible. The result of measurement is shown in Table 2.
(3-3) Overcharging Test Using the cylindrical lithium-ion battery described above, constant voltage and constant current charging was performed up to 4.2 V at 1.5 mA/cm², and the cylindrical lithium-ion battery in the fully charged state was further charged at 5 mA/cm² until SOC 250% or 10 V was reached, to examine behavior of the cylindrical lithium-ion battery.

TABLE 1

| | | Resin | | | | | |
|---|---|---|---|---|---|---|---|
| | | Exothermic Peak during Cooling-Down | | | Endothermic Peak during Heating-Up | | |
| Example No. | Resin Type | Peak Temperature (° C.) | Width at Half Maximum (° C.) | Amount of Heat (J/g) | Melting Point (° C.) | Peak Difference (° C.) | Conductive Material |
| 1 | A | 95.58 | 4.5 | 47.8 | 138.6 | *1 | AB |
| 2 | B | 91.18 | 7.0 | 48.4 | 137.4 | *1 | AB |
| 3 | C | 71.56 | 4.4 | 33.8 | 89.2 | 35.3 | AB |
| 4 | D | 90.36 | 4.6 | 73.4 | 105.1 | *1 | AB |
| 5 | A | 95.58 | 4.5 | 47.8 | 138.6 | *1 | AB + CNT |
| 6 | D | 90.36 | 4.6 | 73.4 | 105.1 | *1 | AB + CNT |
| 7 | E | *2 | *2 | *2 | 87.2 | 39.3 | AB |
| 8 | F | 73.96 | 5.0 | 42.8 | 89.3 | 10.8 | AB |
| 9 | G | 97.07 | 24.9 | 99.4 | 106.3 | 13.5 | AB |
| 10 | H | 140.4 | 3.5 | 55.7 | 174.2 | *1 | AB |

*1: single peak,
*2: no peak
AB: acetylene black
CNT: carbon nanotube

TABLE 2

Current Collector with Conductive Layer

| Example No. | Film Thickness (μm) | Rmax Temperature (° C.) | R50 | Rbmax/R50 |
|---|---|---|---|---|
| 1 | 2.2 | 140 | B | 22 |
| 2 | 2.2 | 140 | B | 13.6 |
| 3 | 3.2 | 100 | B | 45.8 |
| 4 | 2.3 | 110 | C | 45.5 |
| 5 | 1.7 | 140 | A | 65.2 |
| 6 | 1.8 | 110 | B | 105.2 |
| 7 | 2.2 | 110 | D | 1.5 |
| 8 | 2.8 | 100 | C | 3.8 |
| 9 | 2.3 | 100 | B | 4 |
| 10 | 2 | 170 | B | 44.2 |

TABLE 3

Current Collector with Conductive Layer

| Example No. | Film Thickness (μm) | Rmax Temperature (° C.) | R0 | Rmin | Rmax/Rmin | Capacity Retention | Overcharging Test |
|---|---|---|---|---|---|---|---|
| 1 | 2.2 | 140 | B | B | 123 | B | No Change |
| 2 | 2.2 | 140 | B | B | 80.6 | B | No Change |
| 3 | 3.2 | 100 | C | B | 55.8 | C | No Change |
| 4 | 2.3 | 110 | C | C | 108.9 | B | No Change |
| 5 | 1.7 | 140 | A | A | 15909 | A | No Change |
| 6 | 1.8 | 110 | B | B | 20267 | B | No Change |
| 7 | 2.2 | 110 | D | D | 1.5 | D | Smoke Generation |
| 8 | 2.8 | 100 | D | C | 2.6 | D | Smoke Generation |
| 9 | 2.3 | 100 | C | C | 2.8 | D | Smoke Generation |
| 10 | 2 | 170 | B | B | 125.2 | B | Smoke Generation |

<Results>

While resistance change (Rbmax/R50) of the current collector is ten times or more in Examples 1 to 6, resistance change of the current collector is small as ten times or less in Examples 7 to 9. Further, in Example 10 where PVDF is used, resistance change of the current collector is ten times or more but temperature of Rmax is as high as 170° C., and thus, the shutdown function is not exerted at 150° C. or below.

Moreover, while resistance change (Rmax/Rmin) of the current collector is three times or more in Examples 1 to 6, resistance change of the current collector is small as three times or less in Examples 7 to 9. Further, in Example 10 where PVDF is used, resistance change of the current collector is three times or more but temperature of Rmax is as high as 170° C., and thus, the shutdown function is not exerted at 150° C. or below.

Furthermore, while capacity retention of the cylindrical lithium-ion battery is 0.75 or more and no change was observed in the overcharging test in Examples 1 to 6, capacity retention of the cylindrical lithium-ion battery is 0.70 or less and smoke generation was observed in the overcharging test in Examples 7 to 9. Further, in Example 10 where PVDF is used, capacity retention of the cylindrical lithium-ion batteries is 0.75 or more, however, smoke generation was observed.

Hereinbefore, the present invention was described based on the examples. These examples are only exemplification, and it will be understood by a person skilled in the art that various modifications are possible and that such modifications fall within the present invention.

DESCRIPTION OF THE REFERENCE SYMBOLS

103: metal foil, 105: conductive layer, 107: binder material, 111: conductive material, 115: active material layer, 117: electrode

What is claimed is:

1. A current collector comprising:
   metal foil; and
   a conductive layer with a film thickness of 0.1 μm to 10 μm formed on a surface of the metal foil,
      wherein the conductive layer includes a conductive material and a binder material,
   a melting point of the binder material is 80° C. to 150° C., and
   the binder material includes crystalline particles with a number average particle diameter of 10 μm or less, and shows, in differential scanning calorimetry (DSC) in a range from room temperature to 200° C., one or more endothermic peaks in a heating-up process and one or more exothermic peaks in a cooling-down process,
   wherein in a case where two or more endothermic peaks are shown, each difference between the peaks is 15° C. or more,
   in a case where only one exothermic peak is shown, the exothermic peak falls within a range of 50 to 120° C., and a width at half maximum of the exothermic peak is 10° C. or less, in a case where two or more exothermic peaks are shown, a largest exothermic peak among the exothermic peaks falls within the range of 50 to 120° C., and a width at half maximum of the exothermic peak is 10° C. or less, and
   the crystalline particles include one or more kinds of crystalline particles selected from the group consisting of acid-modified polyethylene particles, acid-modified polypropylene particles, and ethylene-glycidyl methacrylate copolymer particles.

2. The current collector of claim 1, wherein the conductive material includes conductive particles.

3. The current collector of claim 2, wherein the crystalline particles include one or more kinds of components having one or more kinds of hydrophilic groups selected from the group consisting of an epoxy group, a carboxyl group, and a carboxylic anhydride group.

4. The current collector of claim 2, wherein the conductive particles include carbon black or carbon nanotube with an aspect ratio of 10 or more.

5. The current collector of claim 1, wherein
the binder material includes a dispersion liquid of water in which crystalline particles are dispersed,
the conductive material includes conductive particles, and
the conductive layer is formed by applying a composition containing the binder material and the conductive material onto the surface of the metal foil.

6. The current collector of claim 5, wherein the conductive layer is subjected to heat treatment at 100 to 150° C. after application of the composition.

7. The current collector of claim 1, wherein
the conductive layer is formed on both front and back surfaces of the metal foil, and
in a resistance-temperature curve, for which resistance is measured on an object formed of a conductive rubber with a diameter of 1 cm which is sandwiched by a pair of the current collectors, which in turn are sandwiched by cylindrical electrodes made of brass with a diameter of 1 cm, while temperature is raised from room temperature to 200° C. at a raising rate of 10° C./ min. in a state where a load of 50 N is applied between the electrodes, Rmax/Rmin is 3 or more, where Rmax denotes a maximum resistance, Rmin denotes a minimum resistance between T0 and Tmax, and Tmax denotes a temperature at which resistance is Rmax.

8. The current collector of claim 1, wherein a maximum resistance Rbmax which is measured above 50° C. and at or below 200° C. on the current collector is three times a resistance R50 at 50° C. or more.

9. An electrode comprising:
the collector of claim 1, and
an active material layer including an active material, formed on the conductive layer of the current collector.

10. A lithium secondary battery comprising the current collector of claim 1.

11. A non-aqueous system lithium secondary battery comprising the current collector of claim 1.

12. An electric double layer capacitor comprising the current collector of claim 1.

13. A lithium-ion capacitor comprising the current collector of claim 1.

* * * * *

UNITED STATES PATENT AND TRADEMARK OFFICE
CERTIFICATE OF CORRECTION

PATENT NO. : 9,741,498 B2
APPLICATION NO. : 14/414399
DATED : August 22, 2017
INVENTOR(S) : T. Iida et al.

Page 1 of 1

It is certified that error appears in the above-identified patent and that said Letters Patent is hereby corrected as shown below:

In the Claims

| Column | Line | Error |
|---|---|---|
| 22 (Claim 9, Line 2) | 13 | "the collector" should read --the current collector-- |

Signed and Sealed this
Twenty-sixth Day of March, 2019

Andrei Iancu
*Director of the United States Patent and Trademark Office*